Jan. 17, 1961

C. E. BRIGHT 2,968,453

DUCTED FAN AIRCRAFT

Filed Jan. 13, 1958

INVENTOR.
Clyde E. Bright
BY

United States Patent Office 2,968,453
Patented Jan. 17, 1961

2,968,453

DUCTED FAN AIRCRAFT

Clyde E. Bright, P.O. Box 143, Roy, Wash., assignor of forty-five percent to Edward F. Golding, Roy, Wash.

Filed Jan. 13, 1958, Ser. No. 708,410

4 Claims. (Cl. 244—12)

This invention relates to aircraft operating on the ducted fan principle.

It is the general object of this invention to provide an aircraft which combines the features of a helicopter and a jet propelled plane which is highly maneuverable, swift in flight, safe, of simple construction and readily applicable to use in areas which are relatively inaccessible to aircraft of conventional types.

The aircraft of the present invention is described herein with reference to the drawings wherein like numerals indicate like parts and wherein.

Figure 1:
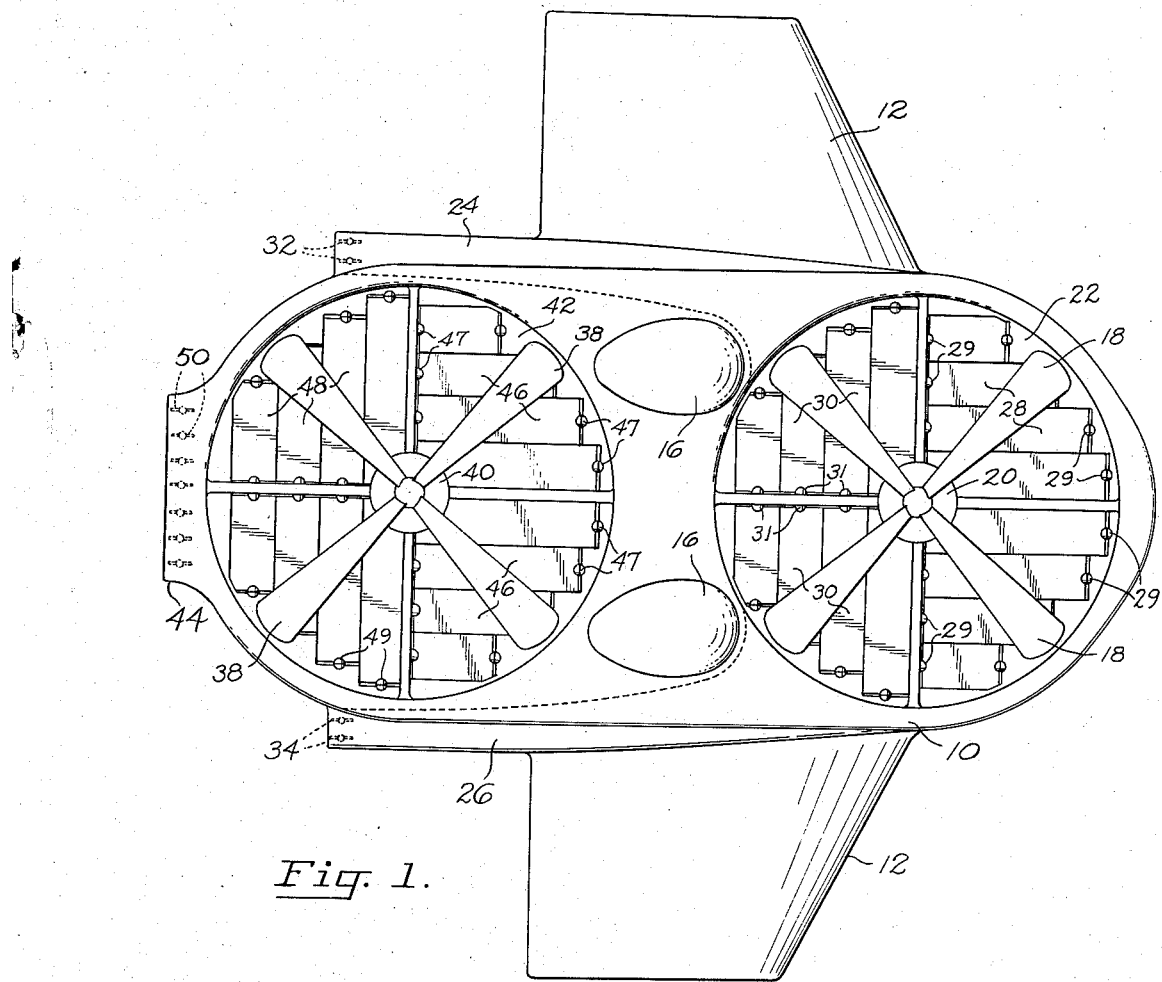
Fig. 1 is a plan view of the presently described aircraft.
Figure 2:
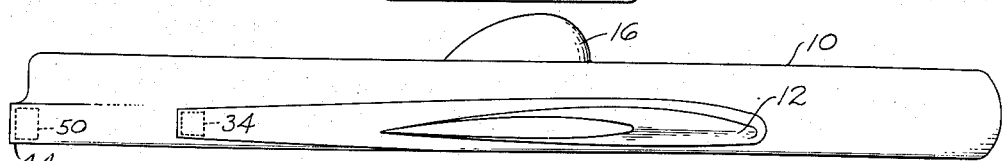
Fig. 2 is a view in side elevation thereof.
Figure 3:
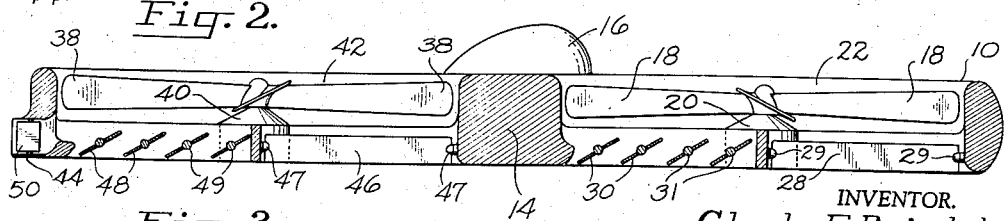
Fig. 3 is a longitudinal sectional view of the aircraft.

Broadly stated, the ducted fan aircraft of my invention comprises a body or fuselage, a vertical duct through the body, a vertically mounted fan, and motor means connected to the fan for rotating the same in a direction calculated to generate a downwardly directed air stream. A horizontal duct is arranged symmetrically with respect to the longitudinal center line of the aircraft and communicates with the vertical duct. Second horizontal ducts are arranged one on each side of the aircraft offset from the longitudinal center line thereof. Valve means are positioned in each of the ducts for directing the air stream generated by the fan through the ducts as required to elevate, lower and propel the aircraft in a predetermined direction.

Considering the foregoing in greater detail and with particular reference to the drawings:

The body of the aircraft is indicated generally at 10. It is provided with a pair of abbreviated wings 12, a centrally located cockpit 14 and dual control stations 16.

In the illustrated form of the invention, the craft is provided with twin rotors or propellers. The first propeller 18 is vertically mounted and driven from a motor 20. It is positioned in a vertical duct 22. This duct communicates with a pair of longitudinal, horizontally disposed ducts 24, 26 which are offset from the longitudinal center line of the craft, one to the right and one to the left.

All three of the ducts open out to the atmosphere and are provided with shutter or valve means for controlling the stream of air generated by rotor 18. Thus a plurality of longitudinally arranged shutters 28 are pivotally mounted on shafts 29 in vertical duct 22. These work from a common control and operate to permit an air stream to flow through duct 22, either straight down or to the right or left as required to elevate the craft, steer it, and offset the torque of the rotor.

A plurality of transversely arranged shutters 30 are pivotally mounted on shafts 31, also located in vertical duct 22. These work from their own control and divert the air stream downwardly, to assist in elevating the craft, rearwardly to drive the craft, or forwardly to reverse the direction of motion.

Means also are provided in ducts 24, 26 for controlling the flow of air therethrough. Thus duct 24 is provided with shutters 32 and duct 26 with shutters 34. These are independently controlled. By suitable adjustment of them the air stream generated by the rotor and deflected into the ducts may be proportioned as required.

Another rotor, rotor 38, is vertically mounted at the rear of the aircraft and driven by motor 40. This rotor works in a vertical duct 42 which, like vertical duct 22, is open at the top and bottom.

A horizontal duct 44 communicates with vertical duct 42. It is arranged substantially symmetrically with reference to the longitudinal center line of the ship and serves a propelling function.

Means also are provided for directing the air stream generated by rotor 38 into one or the other of ducts 42, 44 to impart desired motion to the ship. Thus longitudinally arranged shutters 46 are rotatably mounted on shafts 47 and operate in unison to permit the flow of air through vertical duct 42 to assist in elevating the ship, or to divert it to the right or left to assist in steering it. A plurality of transversely arranged shutters 48 are pivotally mounted on shafts 49, also located in vertical duct 22. These work from a separate control and divert the air stream downwardly to assist in elevating the ship, forwardly to assist in reversing the motion of the ship, or rearwardly through duct 44. Shutters 50 are located at the outlet of this duct to permit the escape of the air stream therethrough, driving the craft forwardly, or to divert it into vertical duct 42 as desired.

The manner of operation of the herein described air craft is apparent from the foregoing. When it is desired to elevate the ship, shutters 28, 30, 46, 48 are opened, shutters 50 are closed, and shutters 32, 34 adjusted as required to compensate for the torque of rotors 18, 38.

Rapid turning the latter generates air streams which are directed in major part downwardly through open ducts 22, 42, causing the ship to rise. When the desired elevation has been obtained, shutters 28, 30, 46, 48 are closed sufficiently to divert a propelling stream through port 44. Shutters 32 and 34 are opened and closed as required to steer the ship when in motion, and to maintain it on a straight course, and shutters 30, 48 adjusted when it is desired to reverse its flight.

Thus it will be apparent by the present invention that I have provided an aircraft which combines the features of a helicopter and a jet propelled plane, which is highly maneuverable, and which flies at a rapid pace. The operation of the ship, however, still is such that it does not require a runway but can take off and land in a restricted space.

It is to be understood that the form of my invention herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. An aircraft of the ducted fan class comprising a body, a pair of vertical ducts through the body communicating with the exterior at both their ends, motor driven fans mounted vertically in the ducts for generating an air stream downwardly therethrough, a horizontal duct communicating with one of the vertical ducts and disposed substantially symmetrically with respect to the longitudinal center line of the aircraft, second horizontal ducts communicating with the other of the vertical ducts and arranged one on each side of the aircraft offset from the longitudinal center line thereof, and adjustable shutter means in the vertical and horizontal ducts for controlling and diverting the streams of air generated by the fans through them for elevating, propelling and steering the aircraft in a selected direction.

2. An aircraft of the ducted fan class comprising a body, a forward vertical duct through the body communicating with the exterior at both its ends, horizontal ducts arranged along the right and left sides of the aircraft and communicating at one of their ends with the forward vertical duct and at the other of their ends with the atmosphere, a first motor driven rotor mounted vertically in the forward duct for generating a downwardly moving air stream therein, adjustable shutter means mounted in the downstream end of the forward vertical duct for controlling the flow of air therethrough in driving and steering operations of the aircraft, adjustable shutter means in each of the said horizontal ducts for controlling the stream of air therethrough in driving and steering operations of the aircraft, a rearward vertical duct communicating with the atmosphere at both its ends, a second horizontal duct arranged symmetrically along the center line of the aircraft and communicating with the rearward vertical duct, a motor driven rotor vertically mounted in the rearward vertical duct for generating a downward stream of air therethrough, adjustable shutter means mounted in the downstream end of the rearward vertical duct for controlling the flow of air therethrough in driving and steering operations of the aircraft, and adjustable shutter means in the second horizontal duct for permitting the escape of air therethrough as required for forward propulsion of the aircraft.

3. In an aircraft, a body, a vertical duct through the body communicating with the atmosphere at both its ends and having a forward and rearward portion, a motor driven rotor mounted in the duct on a vertical axis for generating a downwardly moving air stream therein, a pair of longitudinal ducts communicating with the rearward portion of the vertical duct, longitudinally disposed adjustable shutter means mounted in the downstream end of the vertical duct for controlling the flow of air through a portion of the duct to assist in elevating and steering the aircraft, and transversely disposed adjustable shutter means mounted in the downstream end of the vertical duct for controlling the flow of air through the remaining portion of the vertical duct and the longitudinal ducts to assist in elevating and propelling the aircraft.

4. In an aircraft, a body, a pair of vertical ducts through the body communicating with the atmosphere at both ends and having forward and rearward portions, a motor driven rotor in each duct operating on a vertical axis for generating a downwardly moving air stream therein, longitudinal ducts communicating with the rearward portion of the vertical ducts, longitudinally disposed adjustable shutter means mounted in the downstream end of each vertical duct for controlling the flow of air through a portion of the ducts to assist in elevating and steering the aircraft, and transversely disposed adjustable shutter means mounted in the downstream end of each vertical duct for controlling the flow of air through the remaining portion of the vertical ducts and the horizontal ducts to assist in elevating, propelling and steering the aircraft.

References Cited in the file of this patent

UNITED STATES PATENTS

| | | |
|---|---|---|
| 1,822,386 | Anderson | Sept. 8, 1931 |
| 2,461,435 | Neumann | Feb. 8, 1949 |
| 2,468,559 | Kangas | Apr. 26, 1949 |
| 2,828,929 | Lippisch | Apr. 1, 1958 |

FOREIGN PATENTS

| | | |
|---|---|---|
| 137.654 | Sweden | Oct. 14, 1952 |